United States Patent [19]

Vershowske et al.

[11] Patent Number: 4,909,683
[45] Date of Patent: Mar. 20, 1990

[54] POSITION INDICATING MECHANISM

[75] Inventors: Todd Vershowske, Cheyenne, Wyo.; Wayne Kopidlowski, Oak Creek; Steven Harvey, Milwaukee, both of Wis.

[73] Assignee: Milwaukee Machine Tool, Brookfield, Wis.

[21] Appl. No.: 108,290

[22] Filed: Oct. 13, 1987

[51] Int. Cl.[4] ............................................. B23B 49/00
[52] U.S. Cl. ...................................... 409/218; 33/836; 408/14; 408/16; 408/136; 408/241 S
[58] Field of Search ................... 409/218; 408/14, 15, 408/16, 116, 136, 241 S; 33/201, 772, 773, 775, 779, 836; 116/230, 232

[56] References Cited

U.S. PATENT DOCUMENTS

| 300,038 | 6/1884 | Bean | 116/230 |
|---|---|---|---|
| 2,664,768 | 1/1954 | Clyne | 408/241 S |
| 2,909,082 | 10/1959 | Booth | 408/14 |
| 3,724,964 | 4/1973 | Needham, Jr. | 408/14 |
| 3,732,623 | 5/1973 | Bopst, III | 33/779 |

Primary Examiner—Gil Weidenfeld
Assistant Examiner—Daniel W. Howell
Attorney, Agent, or Firm—Andrus, Sceales, Starke & Sawall

[57] ABSTRACT

A position indicating mechanism for a milling machine or the like includes a position indicator having a rail and a position indicating scale slidably mounted thereto to provide a digital readout of the position of the scale along the length of the rail. A rail mounting bracket is adapted for mounting to the milling machine and for affixing the rail to the milling machine. A scale mounting plate is adapted for connection to the slidable scale, and also for interconnection with a movable collar of the milling machine which moves synchronously with movement of the work-performing component of the machine.

15 Claims, 2 Drawing Sheets

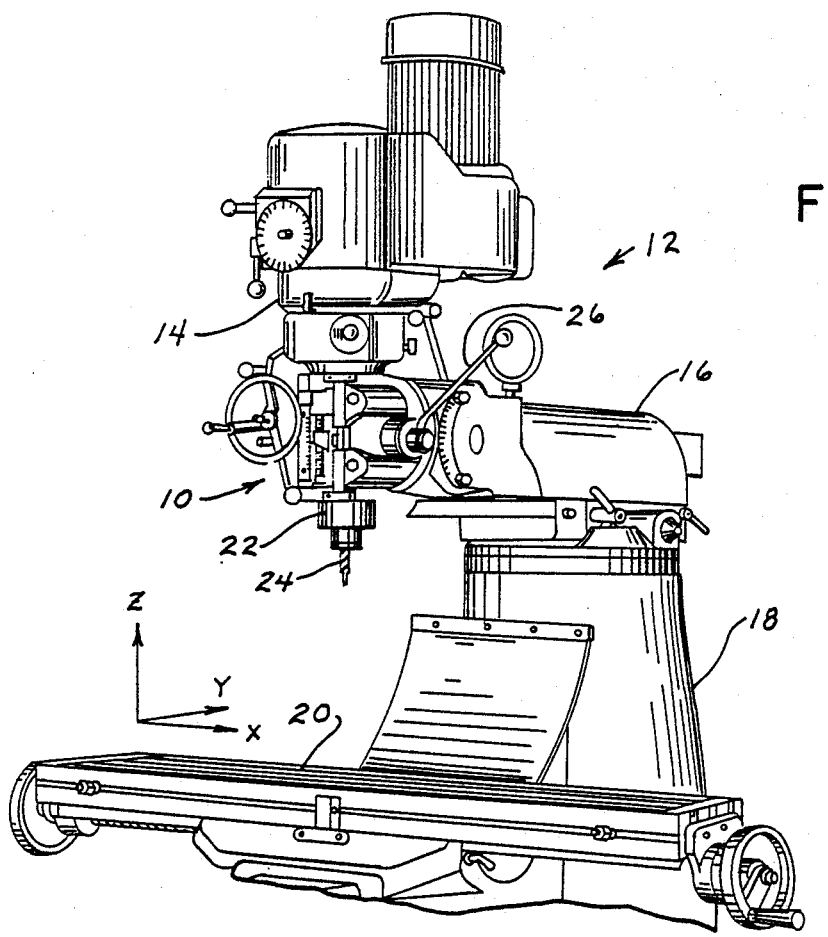
FIG. 1
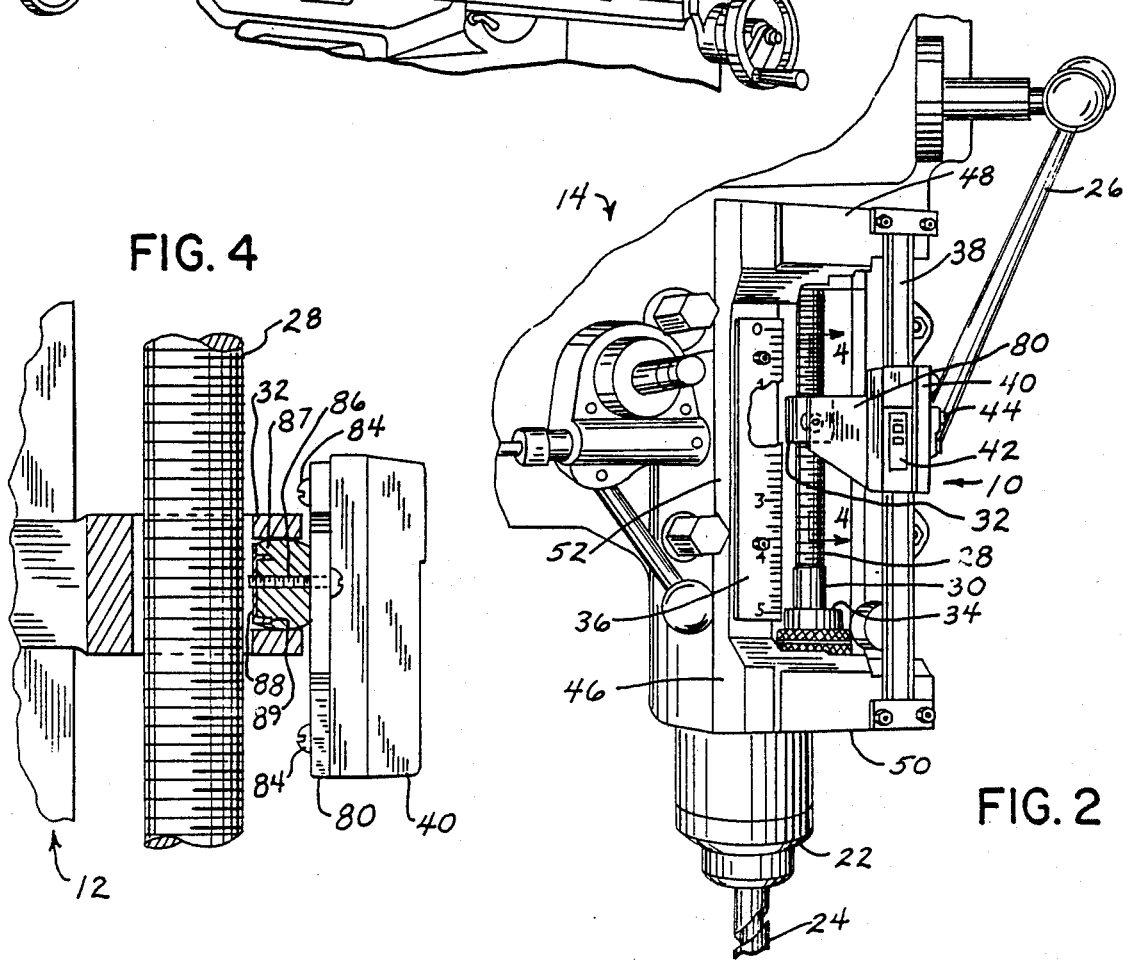
FIG. 4
FIG. 2

POSITION INDICATING MECHANISM

BACKGROUND AND SUMMARY

The present invention relates to machinery for performing an operation on a workpiece, and more particularly to a mechanism for installation on such machinery for determining the position of the work-performing component of the machinery.

A milling machine or the like typically includes a spindle adapted to receive a work-performing tool. The machine is operated such that the spindle and tool are rotated, and may be moved toward and away from a workpiece by use of a manually-operated lever or handle. Movement of the handle causes the rotating spindle and tool to move in a certain direction, typically vertically, and to come into contact with the workpiece to perform an operation thereon, such as boring a hole or the like.

During operation of the machine, it is desirable for the operator to know the precise location of the rotating tool relative to the workpiece. This ensures that th correct penetration of the tool into the workpiece is obtained. Provision of an accurate indication of the tool position allows the operation to be carried out with precision.

The milling machine typically includes a manually operable tool penetration controlling mechanism for controlling the depth of tool penetration into the workpiece. This manually operated mechanism generally includes a position indicating collar mounted so as to surround a threaded rod. The collar is interconnected with the lever or handle for indicating the depth of penetration of the tool. The internal workings of the machine are designed so that the collar moves synchronously with, and in response to, movements of the spindle and its associated tool. A stop mechanism is provided for limiting the movement of the collar past a certain point. The stop mechanism generally includes a shouldered nut threadedly engaging the threaded rod, and movable along the length of the rod. After placement of the shouldered nut to the desired position, the lever is operated to allow the tool to penetrate the workpiece. Upon engagement of the position indicating collar with the shouldered nut, further penetration of the tool into the workpiece is prevented. This system provides tool penetration control, but is limited by the accuracy of the stop mechanism.

The present invention is intended to provide a more precise mechanism for ascertaining the exact position of the work-performing tool of the machine. In accordance with the invention, a position indicating mechanism includes a linear position indicator means mounted to the machine for providing an indication of the linear position of the work-performing component, such as the spindle and its associated tool. The position indicator means includes an elongated rail and a position indicating scale slidably mounted thereto. The scale is adapted to provide a highly accurate digital readout of its position along the length of the rail. A rail mounting means is provided for affixation to the ends of the rail for rigidly mounting the rail to the machine. A scale mounting means is provided for mounting the position indicating scale to the position indicating collar, which is synchronously movable with the work-performing component of the machine. Therefore, when the handle of the machine is moved so as to raise or lower the work-performing component of the machine, such as the rotating tool, and the position indicating collar moves synchronously therewith, the slidable scale of the position indicating means moves along the rail accordingly to provide an accurate indication of the linear position of the tool. In one embodiment, the scale mounting means comprises a bracket adapted for mounting on the machine to position the scale adjacent the collar. The bracket is provided with means for mounting the scale thereto. The scale mounting means comprises a mounting plate fixedly connected to the scale, and adapted for connection to the movable collar. In this manner, with each component of the position indicating scale mounted to the milling machine, the scale moves slidably along the rail in response to movement of the collar which moves synchronously with the spindle and tool, to provide an accurate indication of the amount of movement of the spindle and tool.

BRIEF DESCRIPTION OF THE DRAWINGS

The drawings illustrate the best mode presently contemplated of carrying out the invention.

In the drawings:

FIG. 1 is a perspective view of the top portion of a milling machine provided with the present invention;

FIG. 2 is a close-up perspective view of a portion of the head of a milling machine provided with the present invention, with a portion broken away for clarity;

FIG. 4 is a sectional view taken generally along line 4—4 of FIG. 2.

DETAILED DESCRIPTION

Figure 3:
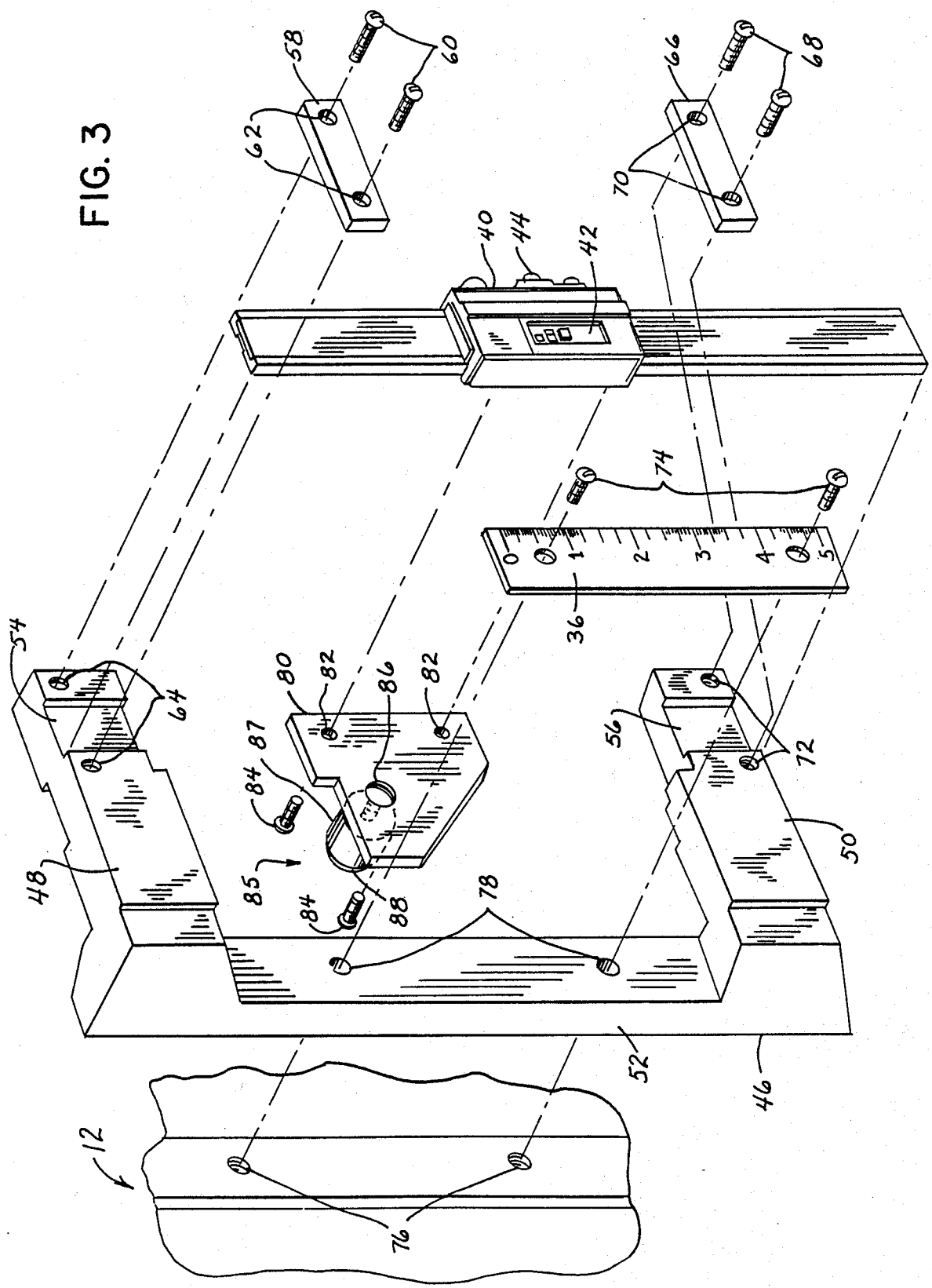
FIG. 3 is an exploded assembly view of the present invention.

As shown in FIG. 1, a position indicating mechanism 10 is adapted for installation on a milling machine 12. Milling machine 12 is of well known construction, including a head portion 14, a turret 16, a column 18 and a table 20. Milling machine 12 is adapted for performing a variety of work operations on a workpiece (not shown). The work operations performed are generally carried out with reference to X, Y and Z-axes, shown in FIG. 1 for reference.

Head 14 is provided with a spindle 22, which is adapted to receive a tool 24 for performing a work operation, such as boring a hole or the like, on the workpiece. Spindle 22 is adapted to be extended downwardly away from head 14. A handle 26 is provided for manual operation by an operator, for controlling the downward extension of spindle 22 and its associated tool 24. When head 14 is in its upright position as shown in FIG. 1, extension of spindle 22 and tool 24 downwardly away from head 14 results in movement of spindle 22 along the Z axis. In this manner, when spindle 22 is rotated by th drive system of the milling machine, as is well known, tool 24 is likewise rotated for performing a work operation on a workpiece. In a typical application, handle 26 is rotated counterclockwise to produce a downward movement of spindle 22 toward table 20 and the workpiece situated thereon, for performance of a work operation on the workpiece by tool 24.

With reference to FIG. 2, head 14 of milling machine 12 typically includes a variable position stop mechanism for controlling the amount of extension of spindle 22 away from head 14. The stop mechanism generally includes a threaded rod 28 rigidly fixed to head 14, as well as a threaded stop 30 adapted to mate with threaded rod 28, and a collar 32. Collar 32 is provided around, but does not engage threaded rod 28. Collar 32 is interconnected with spindle 22 so as to move synchronously therewith when spindle 22 is extended, as is well known.

Stop 30 includes a shoulder portion 34. A graduated scale 36, shown in the drawing as mounted on position indicating mechanism 10, is typically mounted directly to milling machine 12 adjacent threaded rod 28. Stop 30 is manually selectively positioned along the length of threaded rod 28 so that shoulder 34 is in the desired location, as can be determined by viewing scale 36. Once stop 30 and shoulder 34 have been appropriately positioned, the milling operation may be undertaken with the operator moving handle 26 to extend rotating spindle 22 and tool 24. When handle 26 is rotated counterclockwise to extend spindle 22 away from head 14 to perform a milling operation, collar 32 moves synchronously therewith. Upon engagement of collar 32 with shoulder 34 of stop 30, downward movement of spindle 22 is thereafter prevented due to the interconnection of collar 32 with spindle 22. Thus, the selective positioning of stop 30 and its associate shoulder 34 acts to prevent movement o collar 32 downward past the point at which shoulder 34 is disposed. In this manner, extension of spindle 22 and tool 24 is simultaneously prevented, so that further penetration of tool 24 into the workpiece is prevented.

Collar 32 is generally provided with an opening facing outwardly away from head 14. The opening is disposed generally perpendicularly to the direction of movement of collar 32 along threaded rod 28.

The position indicating mechanism 10 is intended to supplement and render more accurate the above-described system. Position indicating mechanism 10 includes a linear position indicator having an elongated rail 38 and a position indicating scale 40 slidably mounted to rail 38. Scale 40 includes a digital readout 42, which changes according to the position of scale 40 along rail 38. Scale 40 and rail 38 may be a unit such as the Digimatic scale unit Series 572, manufactured by the Mitutoyo Manufacturing Co., Ltd. of Tokyo, Japan. Scale 40 is adapted to slide along rail 38 and interact therewith, so that the digital readout 42 indicates to a precise degree the amount of distance covered by scale 40 during movement along rail 38. The readout o distance covered may be in either inches or millimeters. Scale 40 is generally provided with a depressible switch 44, which resets the digital readout 42 to zero, as desired by the operator.

A C-shaped bracket 46 is provided for mounting rail 38 to milling machine 12 adjacent to collar 32. Bracket 46 includes top and bottom laterally extending portions 48 and 50, respectively. Bracket 46 may be constructed of any satisfactory material, such as cast aluminum or the like. A connecting portion 52 spans between top and bottom lateral portions 48 and 50. Top and bottom laterally extending portions 48 and 50 are each adapted to provide a mount for an end of rail 38. As shown in FIG. 3, top portion 48 is provided with a recess 54, adapted to receive the top portion of rail 38. Likewise, bottom portion 50 is provided with a recess 56 adapted to receive the bottom portion of rail 38. To mount rail 38 to bracket 46, the top and bottom portions of rail 38 are positioned in recesses 54 and 56, respectively. A clamping plate 58 is then positioned over the outwardly-facing side of the top end of rail 38. A pair of threaded fasteners, such as screws 60, are inserted through a pair of openings 62 provided in plate 58, and are threadedly engaged with a pair of openings 64 provided in top portion 48 of bracket 46. Screws 60 are then tightened so as to engage plate 58 and to rigidly affix the top portion of rail 38 to top portion 48 of bracket 46. In a similar manner, the bottom end of rail 38 is affixed to bottom portion 50 of bracket 46 by threadedly engaging a pair of screws 68 with a pair of openings 72 provided in bottom portion 50, through a pair of openings 70 provided in a clamping plate 66. When mounted to bracket 46, rail 38 extends generally parallel to the direction of movement of collar 32.

The rear faces of top and bottom portions 48, 50 of bracket 46 are provided with a stepped configuration, which provides clearance between bracket 46 and the various components of milling machine 12.

Connecting portion 52 of bracket 46 is adapted for mounting on milling machine 12. As previously noted, a graduated scale 36 is typically mounted to milling machine 12. This mounting is by a pair of threaded fasteners, such as screws 74, engaging a pair of openings 76 provided in milling machine 12. Connecting portion 52 of bracket 46 is provided with a pair of openings 78, spaced correspondingly to the spacing between openings 76 in milling machine 12. To mount bracket 46 to milling machine 12, screws 74 are removed from openings 76, to release graduated scale 36. Bracket 46 is then positioned over the mounting area for graduated scale 36 so that openings 78 are aligned with openings 76. Screws 74 are then refastened to milling machine 12 through openings 78 in connecting portion 52, to mount bracket 46 thereto. Graduated scale 36 may be mounted to connector portion 52 of bracket 46 using screws 74, as shown.

A scale mounting means, such as a mounting plate 80, is provided to interconnect digital scale 40 with collar 32. Scale 40 has a pair of threaded openings disposed on its backside (not shown), and mounting plate 80 has a pair of holes 82 formed therein corresponding to the openings in the backside of scale 40. A pair of threaded fasteners, such as screws 84, are adapted to pass through openings 82 in mounting plate 80 and threadedly engage the treaded openings provided in scale 40. In this manner, mounting plate 80 is rigidly secured to scale 40.

A resilient sleeve assembly 85 is provided for interconnecting mounting plate 80 with the outwardly facing opening provided in collar 32 of milling machine 12, as shown in FIGS. 3 and 4. Mounting plate 80 includes an opening for accommodating the passage of a machine screw 86 therethrough. Screw 86 passes through plate 80 and extends through a latex rubber sleeve 87. A tee nut 88 is provided at the end of rubber sleeve 87 and has prongs 89 embedded therein, and a central opening adapted to receive screw 86. As screw 86 is tightened down against plate 80, tee nut 88 is drawn toward plate 80 and forces the sides of rubber sleeve 87 to expand. This expansion of rubber sleeve 87 causes its side portion to engage the internal sides of the outwardly facing opening in collar 32 of milling machine 12, to effectively lock mounting plate 80 to collar 32. This system accommodates irregularities in the internal surfaces of the opening in collar 32, so as to eliminate relative movement between mounting plate 80 and collar 32 during movement of collar 32. In this manner, an accurate readout is provided of the precise position of collar 32, and likewise the position of spindle 22 and its associated tool 24.

With different makes and models of milling machine 12, the diameter of the outwardly facing opening in collar 32 may vary. Use of resilient sleeve assembly 85 allows universal mounting of position indicating scale 40 on a variety of different makes and models of milling machines.

Mounting plate 80 may be notched or provided with an inclined surface, as shown at the top and bottom of plate 80, respectively. Such notches or inclines allow movement of scale 40 along the entire length of rail 38, and avoid obstructions provided by top and bottom portions 48, 50 of bracket 46 during movement of plate 80 during operation.

Position indicating mechanism 10 is preferably used by first positioning the point of tool 24 so as to contact the workpiece. Switch 44 may then be depressed to reset the digital readout to zero, after which a work operation is performed by penetrating tool 24 into the workpiece. The digital readout 42 of scale 40 is then monitored so that the proper amount of penetration of tool 24 into the workpiece is attained.

As can be seen, the present invention provides a convenient and expedient mounting for a digital position indicating scale mechanism, for retrofit to a milling machine or the like. When installed as described, the digital position indicating mechanism provides a precise indication of the amount of extension of spindle 22 and its associate tool 24, to provide an accurate indication of the amount of penetration of tool 24 into a workpiece.

While the invention has been described with reference to a milling machine, it is recognized that the invention is usable in connection with other machines having a work-performing component for performing an operation on a workpiece, such as a drill press.

Various alternatives are recognized as being within the scope o the following claims particularly pointing out and distinctly claiming the subject matter regarded as the invention.

I claim:

1. A position indicating mechanism for a milling machine or the like, said machine having a linearly movable work-performing component for performing an operation on a workpiece and a linearly movable element removed from and interconnected to said linearly movable work-performing component and synchronously movable therewith, said position indicating mechanism comprising:
   linear position indicator means for providing an indication of the linear position of said linearly movable work-performing component, said position indicator means including an elongated rail and a position indicating scale slidably mounted thereto;
   rail mounting means for connection to the ends of said rail for rigidly affixing said rail to said machine adjacent said linearly movable element; and
   scale mounting means for mounting said position indicating scale to said linearly movable element synchronously movable with said work-performing component, so that said position indicating scale is movable along said rail in response to linear movement of said linearly movable element to provide an indication of the linear position of said work-performing component.

2. The invention according to claim 1, wherein said linear position indicator means provides a digital readout of the position of said linearly movable work-performing component.

3. The invention according to claim 1, wherein said rail is mounted to said rail mounting means so as to be disposed substantially parallel to the direction of linear movement of said linearly movable element interconnected to said work-performing component of said milling machine.

4. The invention according to claim 3, wherein said linearly movable element synchronously movable with said work-performing component comprises a collar interconnected with said work-performing component, said collar adapted to move linearly and synchronously with linear movement of said work-performing component, and wherein said scale mounting means comprises a scale mounting plate fixedly connected to said position indicating scale and adapted for fixed interconnection with said collar so that said position indicator scale moves linearly along said rail in response to linear movements of said collar to provide an indication of the position of said work-performing component.

5. The invention according to claim 4, wherein said collar is provided with an opening disposed along an axis perpendicular to the direction of linear movement of said collar, and wherein said scale mounting plate includes mating means for mating with said collar opening for providing a fixed interconnection of said scale mounting plate to said collar.

6. The invention according to claim 5, wherein said mating means comprises a resilient sleeve assembly having an expandable sleeve member extending from said scale mounting plate and adapted to mate with said collar opening and to engage said collar opening to reduce the potential for relative movement between said scale mounting plate and said collar and to provide an accurate indication of the position of said work-performing component.

7. The invention according to claim 3, wherein said rail mounting means comprises a bracket having a laterally extending bottom portion and a laterally extending top portion spanned by a connecting portion extending therebetween.

8. The invention according to claim 7, wherein said bracket is substantially C-shaped, and wherein said connecting portion of bracket is adapted for mounting to said machine.

9. The invention according to claim 8, wherein said laterally extending top and bottom portions of said bracket are provided with rail mounting means for mounting said rail of said position indicator means thereto.

10. The invention according to claim 9, wherein said rail spans between said laterally extending top and bottom portions of said bracket, and further comprising retainer means for affixing said rail to said op and bottom portions of said bracket means.

11. The invention according to claim 10, wherein said retainer means comprises clamping means for clamping said rail to said top and bottom portions of said bracket.

12. An assembly for mounting a linear position indicator on a milling machine or the like, said machine having a linearly movable work-performing component for performing an operation on a workpiece and a linearly movable element removed from and interconnected to said linearly movable work-performing component and synchronously movable therewith, said linear position indicator including an elongated rail with a position indicating scale slidably mounted thereto, said assembly comprising:
   rail mounting means adapted for mounting on said machine for connection to the ends of said rail for rigidly affixing said rail to said machine, and for positioning said rail of said linear position indicator adjacent said linearly movable element of said machine; and scale mounting means for mounting said position indicating scale to said linearly movable element synchronously movable with said work-performing component, so that said position indicating scale is movable along said rail in response to linear movements of said linearly movable element to provide an indication of the linear position of said work-performing component.

13. The invention according to claim 12, wherein said rail mounting means comprises a bracket having a laterally extending top portion and a laterally extending bottom portion spanned by a connecting portion extending therebetween, and wherein said rail spans between and has its respective top and bottom ends rigidly affixed to said respective top and bottom laterally extending portions of said bracket, said rail being mounted on said machine so as to be disposed substantially parallel to the direction of movement of said linearly movable element interconnected to and synchronously movable with said work-performing component.

14. The invention according to claim 12, wherein said linearly movable element interconnected to and synchronously movable with said work-performing component is provided with an outwardly facing opening disposed along an axis generally transverse to the direction of movement of said linearly movable element, and wherein said scale mounting means comprises a scale mounting plate fixedly connected to said position indicating scale and having a projection extending therefrom adapted to mate with said opening provided in said linearly movable element.

15. The invention according to claim 14, wherein said mating means comprises a resilient sleeve assembly having an expandable sleeve member for bearing against the inner surface of said opening in said linearly movable element to provide a tight connection of said scale mounting plate to said opening to reduce the potential for relative movement between said scale mounting plate and said linearly movable element and to provide an accurate indication of the position of said work-performing component.

* * * * *